United States Patent [19]

Marzel et al.

[11] 4,243,698
[45] Jan. 6, 1981

[54] METHOD FOR PRODUCING A PIGMENT COATING

[75] Inventors: Otto Marzel, Illerrieden; Wilhelm Schwedes, Ulm-Ermingen; Alfred Wilhelm, Ulm, all of Fed. Rep. of Germany

[73] Assignee: Licentia Patent-Verwaltungs-G.m.b.H., Frankfurt am Main, Fed. Rep. of Germany

[21] Appl. No.: 65,882

[22] Filed: Aug. 13, 1979

[30] Foreign Application Priority Data

Aug. 12, 1978 [DE] Fed. Rep. of Germany ....... 2835432

[51] Int. Cl.³ .................... B05D 1/32; B05D 1/38; C09K 11/06; C09K 11/08
[52] U.S. Cl. .................................. 427/157; 427/68; 427/235; 427/264
[58] Field of Search ................ 427/68, 157, 235, 264

[56] References Cited

U.S. PATENT DOCUMENTS 3,776,754   12/1973   Levinos .................... 427/68 X

FOREIGN PATENT DOCUMENTS 1069752   7/1954   France .
1146522   3/1969   United Kingdom .

Primary Examiner—James R. Hoffman
Attorney, Agent, or Firm—Spencer & Kaye

[57] ABSTRACT

A method is disclosed for producing a pigment coating on a substrate. A hardenable polymer coating is initially provided on the substrate, followed by an excess of hardening agent. This produces a first hardened coating with sufficient hardening agent remaining to harden a second polymer coating, containing suspended pigment, which is deposited on top of the first coating. The polymer is then pyrolyzed, leaving a coating of pigment on the substrate.

21 Claims, 8 Drawing Figures

METHOD FOR PRODUCING A PIGMENT COATING

BACKGROUND OF THE INVENTION

The present invention relates to a method for producing a coating of a pigment on a substrate.

There are several well known methods for producing coatings of pigments in powder form on a substrate having planar or spherically shaped surfaces. These methods include spraying, screen printing, sedimentation and the photo-optic method. Each of these methods is limited to special applications.

With spray methods, it is very difficult to obtain a homogeneous coating of uniform thickness over the entire surface area of an extensively structured surface. In particular, surfaces in the shadow of the spray cannot be satisfactorily coated.

Screen printing is limited to surfaces which are planar or curved in one direction only.

Sedimentation utilizes a force which acts predominently in one direction only. The thickness of the coating of the pigment substance will thus vary depending on the angle of inclination of the substrate surface.

The photo-optic method utilizes light to cross link a photo-lacquer. When the substrate surface to be coated has a surface configuration which causes light to strike the surface at different angles of incidence, different degrees of cross-linking of the photolacquer are produced.

SUMMARY OF THE INVENTION

It is an object of the present invention to provide a method for depositing a uniform layer of pigment on a substrate.

It is also an object of the present invention to provide a method for depositing a uniform layer of pigment on a substrate with a planar surface, or an irregular surface, such as a fissured surface whose cavities have a small radius of curvature, or a surface with edge faces forming angles. An additional object of the present invention is to form a uniformly thick pigment layer.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects, and in accordance with its purpose, the present invention provides a method for producing a coating of pigment on a substrate, comprising: (a) providing the substrate with a first coating of a chemically hardenable polymer, and then drying the first coating; (b) contacting the dried first coating with a hardening agent compatible with the polymer in an amount sufficient to completely harden the polymer and to leave excess hardening agent on the surface of the polymer; (c) subsequently providing the first coating with a second coating comprising a polymer which is compatible with the agent and a pigment suspended therein, such that a portion of the second coating is hardened by the excess agent; (d) removing the non-hardened portion of the second coating; and (e) heating the coated substrate for a time and at a temperature sufficient to pyrolize the hardened polymers, but insufficient to decompose the pigment, to leave the substrate covered only with the pigment.

It is to be understood that both the foregoing general description and the following detailed description are exemplary, but are not restrictive of the invention.

DETAILED DESCRIPTION OF THE INVENTION

Figure 1A:
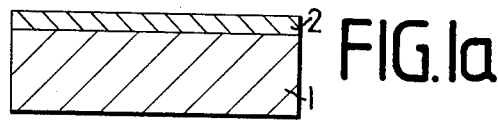
FIGS. 1a through 1f represent a cross section of a substrate being coated according to one embodiment of the process of the present invention, at different stages of the process.
Figure 1B:
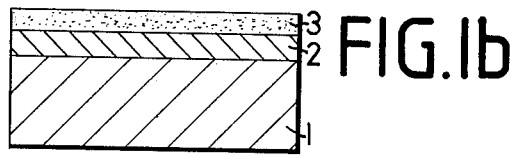
Figure 1C:
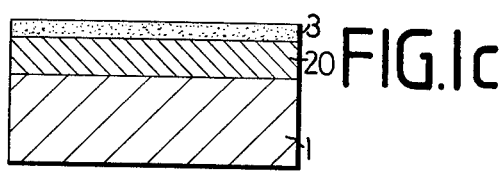

In the practice of the present invention, a substrate is initially coated with a first layer of polymer. The substrate is advantageously glass ceramic, but can be any type of material compatible with the coatings, and which does not decompose at the necessary pyrolysis temperature. Such substrate materials are, for instance, glass, metal or ceramic materials.

The polymer used for the first coating must be one which is hardenable by chemical means. Water-soluble polymers are preferably used as the hardenable polymers. Suitable for this purpose are polyvinyl alcohol, polyvinyl pyrrolidone and cellulose derivatives such as methyl- and carboxy-methyl-cellulose.

These particular materials are advantageous in that they are water soluble, easy to handle, environmentally safe, and inexpensive.

The coating steps of the present invention may be accomplished by any suitable method. Typically, the polymer is applied from a solution and the substrate is immersed directly into the polymer solution to insure a complete coating. Spraying and centrifugal action may also be used.

Following the first coating, the substrate is dried to remove at least a part of the coating solvent. Before or during the drying step, suction or forced air may be used to remove pockets of coating solution from cavities, leaving only a film of coating on the cavity walls. Drying is commonly accomplished at 100° to 150° C.

The coated, dried substrate is then contacted with an excess of hardening agent to quantitatively harden the first coating. The particular agent chosen is not critical, so long as it is suitable for use with the polymer of the first coating. Tannic acid and tannic acid derivatives (tannins) are preferred for this application.

The agent can be applied by any suitable method, which will result in an excess amount of agent being applied to the first coating. By "excess", it is meant that more is applied than is necessary to completely harden the first polymer coating, and enough should remain on top of the hardened first coating on the surface facing away from the substrate to harden a second coating of desired thickness. The hardenable polymer may be a 2 to 15 weight % aqueous solution of polyvinylalcohol (molecular weight about 20000–90000) which is hardened by a 3–15% aqueous solution of tannin. After drying the thickness of the hardened first coating is about 1 to 12 microns preferably 5 to 10 microns.

Immersion of the substrate in a solution of the agent is generally suitable for saturation of the coating with agent, and applying thereby an excess of agent. Following hardening of the first coating, the substrate may be dried for some minutes at 100° to 150° C. to remove a least a part of excess solvent.

A second polymer coating is then applied, which contains a suspension of pigment. The polymer chosen should be one which is compatible with the agent applied in the previous step, that is, hardened by it, and can be, but need not be identical to the polymer which was previously coated on the substrate. As polymers for applying the pigment layer polymers like polyvinylalcohol, polyvinylpyrrolidone and cellulose derivatives can be applied. Different polymers can be used to form the first an second polymer layer.

The polymer solution from which the second coating is applied should have suspended within it, a quantity of pigment. The term pigment is used herein in its ordinary meaning; that is, a finely divided substance which colors or otherwise changes optical properties. Pigments are normally insoluble in their coating medium.

Pigments may be inorganic, organometallic or organic in nature. In general, inorganic pigments are preferred for the process of this invention due to their usually greater stability when heated. Any pigment may be used, however, provided that it is stable at the temperatures needed for pyrolysis of the polymer. Some typical pigments are listed in the table below:

| COLOR | PIGMENT |
| --- | --- |
| red | iron oxides, cadmium selenide, coal tar dirivatives |
| orange | basic lead chromate, lead chromate molybdate |
| brown | iron oxides |
| yellow | synthetic iron oxides, lead chromate, benzidene yellow |
| green | chomium oxide, copper-phthalocyanine green |
| blue | ferric ferrocyanide, copper phthalocyanine blue Thenard's blue, |
| black | carbon black, |
| white | titanium dioxide, zinc oxide, magnesium oxide |

Some typical luminescent pigments are:

| COLOR | PIGMENT | |
| --- | --- | --- |
| red | yttriumoxysulfide | Eu |
| | yttriumoxide | Eu |
| | yttriumvanadate | Eu |
| green | cermagnesiumaluminate | Tb |
| | zincsilicate | Mn |
| | zincsulfide | Cu |
| | yttriumoxysulfide | Tb |
| blue | strontiumchlorophosphate | Eu |
| | calciumtungstate | |
| | zincsulfide | Ag |
| | bariummagnesiumaluminate | Eu |
| | yttriumsilicate | Ce |

The amount of pigment suspended in the polymer solution can be between 20 and 100% by weight, based on the weight of the polymer solution without the pigment in it. The thickness of the pigment layer may vary from 1 micron to about 100 microns. Very good results are obtained with a thickness of the pigment of about 10 to 30 microns with a particle size of the pigment of about 5 microns.

In a preferred embodiment, the pigment of the present invention is a luminous material, that is, one which radiates visible light when exposed to ultraviolet light, x-rays or corpuscular rays, as, for instance, electrons.

When the polymer solution containing the pigment is coated on the substrate, hardening is initiated by the excess of agent previously applied. The pigment is thus embedded in the second polymer layer and adheres to the first polymer layer. Any excess unhardened polymer in the second layer can be removed by forced air or suction.

If the substrate is coated with an organic or organometallic pigment the process is finished with a drying step at a temperature of about 100° to 150° C. to remove the solvent components.

If the substrate is coated with an inorganic pigment, in a next process step, the coated substrate is heated to a temperature sufficient to cause a quantitative pyrolysis of the polymer materials but which does not result in decomposition of the pigment. The hardened polymer layers are heated until all organic components of the layers have been decomposed and removed. The pyrolysis generally takes place at about 350° to about 600° C., but the temperature of decomposition should be determined for the particular polymers used. Pyrolysis of the polymer results is gaseous decomposition products, such as carbon dioxide and water, which are easily removed, for example, by suction. The substrate is preferably heated until all of the polymer materials used for the coatings are completely removed, leaving a pure, homogenous coating of pigment which adheres well to the substrate.

The final thickness of the pigment layer is adjusted by controlling various parameters. Thus, the amount of hardening agent applied will affect the pigment layer and this can be controlled by adjusting the concentration of the agent. In addition, the number of times the agent is applied by immersing the substrate with associated intermediate drying also will determine the final thickness. The amount of the excess hardening agent in and on the hardened first polymer layer controls the amount of the hardened aqueous polymer solution containing pigment. The first polymer layer has the task to flatten the surface of the substrate and to form a thin coating which—after being hardened—is able to contain much hardening agent in excess. This can be controlled by the molecular weight of the polymer. Good results are obtained with a 10% polymer solution of low molecular weight (PVA; molecular weight: 22000). The concentration of the hardening agent (tannin) varies from about 1% to 15%. Using a 10% tannin solution only one immersion is necessary to harden the first polymer layer and to retain sufficient agent in excess. Using a less concentrated tannin solution the immersion can be repeated once or twice with associated intermediate drying. The molecular weight of the polymer and the concentration of the polymer in the pigment suspension will also affect layer thickness, along with the concentration of pigment in the suspension, the temperature of application of the first polymer layer and of the succeeding pigment layers, and the time during which the pigment suspension is in contact with the substrate. Polymer solutions with always the same weight percentage of polymer show in dependence on their molecular weights different viscosities and therefore a different behaviour when sucked out of the cavities. Of a polymer solution with a higher molecular weight a greater part is hardened by the same amount of hardening agent than of a polymer with lower molecular weight. The pigment concentration in the suspension is dependent on the specific weight of the pigment. For a polymer solution containing $Y_2O_3$: Eu (particle size of about $5\mu$) as a red luminescent material a weight concentration of about 60% is chosen. The polymer is a polyvinylalcohol (molecular weight of about 80000) and is diluted to a 4% aqueous solution. The substrate is immersed in the pigment suspension for about ½ to 5 minutes and then the not hardened suspension is sucked out. Before immersing the substrate and the pigment suspension have a temperature of about 25° C. But also substrates and pigment suspensions with higher temperature can be used (e.g. 50° C.); then the immersions time can be shortened to obtain a pigment layer of the same thickness. Altering the temperature of pigment suspension you have also the possibility to control the viscosity. Higher temperatures result in a less viscous suspension. The thickness of the luminescent layer after the pyrolysis at a temperature of about 450° for about 1 hour is about 20 microns. The substrate is homogeneously coated with the pigment.

In one embodiment of the present invention, the substrate may be masked following application of the first polymer coating and different pigments applied to different portions of the substrate by repeating the steps of applying excess agent, providing the second polymer coating, and removing excess coating. This embodiment employes variable masking to cover different regions of the substrate with different pigments. With the use of covering masks and appropriate displacement of such masks, it is possible, using the method of the present invention, to separately cover the walls of cavities in a substrate surface having a plurality of such cavities with different types of pigments. Thus, the inner walls of cylindrical cavities can be coated with layers of different pigments.

Figure 1D:
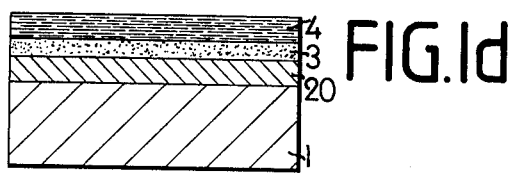
Figure 1E:
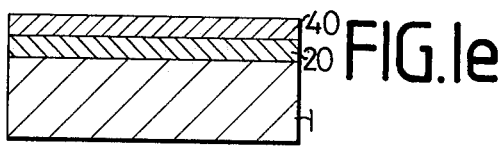
Figure 1F:
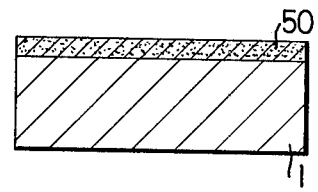

FIGS. 1 through 1f show a cross section of a substrate subject to the process of the present invention. In FIG. 1a, a substrate 1, on whose surface a pigment coating is to be produced, has been coated with a first coating of a hardenable organic polymer layer 2. After a drying step, a hardening agent 3 is deposited on top of polymer layer 2, as shown in FIG. 1b. The agent 3 initiates a quantitative hardening of polymer layer 2, thereby converting it into a hardened polymer layer 20 shown in FIG. 1c. Since an excess agent 3 is provided to act on polymer layer 2, there remains unspent agent 3 on the top of hardened polymer layer 20 as shown in FIG. 1c.

A suspension 4 of polymer and pigment, as shown in FIG. 1d, is then applied to the already hardened polymer layer 20 which is still covered by an excess of an agent 3 which initiates hardening. Suspension 4 reacts with agent 3 remaining on the hardened polymer layer 20. Excess portions of the suspension 4 of polymer and pigment, respectively, i.e., quantities which have not been cross-linked or hardened by agent 3 are then removed from the surface of substrate 1. There then results the state of the process shown in FIG. 1e where substrate 1 is covered with a first layer of a hardened polymer 20 which itself is covered by a second layer of a hardened polymer 40 which additionally contains pigment components.

Substrate 1, now covered with two hardened layers 20 and 40, is then heated until all organic components of layers 20 and 40 have been decomposed and removed. This pyrolysis step results in a substrate 1 which has been coated with a layer 50 which contains only pigment, as shown in FIG. 1f.

The present invention is particularly suitable for the production of pigment coatings on extensively structurized substrate surfaces, or on cavity walls which have a particularly small radius of curvature, and on which prior art methods were unable to produce quality coatings of pigments. The present invention uses the knowledge that homogeneous coatings of pigment can be produced by hardening polymer compounds while simultaneously embedding pigments therein, and subsequently removing the organic components by way of pyrolysis.

In the method according to the invention, a portion of the hardening agent initiates hardening in a suitable polymer layer applied to the cavities of the substrate to be coated, while another portion of the agent which is applied in excess adheres unspent to the hardened polymer layer. A polymer solution containing pigments is subsequently applied to these cavities and is hardened by the excess agent in such a way that the pigment is embedded in this hardened polymer layer and adheres to the hardened polymer layer that had previously been applied to the substrate. The excess portions of the suspension of polymer and pigment which are not bound by hardening can advisably be removed by suction or blowing them out of the cavities of the substrate. The subsequent pyrolysis decomposes the polymer layers leaving only a pigment coating on the substrate.

With the use of the process of the present invention, it has been found possible to coat pigments on substrates of complex configuration, such as those having conically, cylindrically or trough-shaped cavities or those whose surfaces have faces forming angles.

The following example is given by way of illustration to further explain the principles of the invention. This example is merely illustrative and is not to be understood as limiting the scope and underlying principles of the invention in any way. All percentages referred to herein are by weight unless otherwise indicated.

EXAMPLE

Perforated glass ceramic plates of about 1.3 mm thickness were used for coating. The plates had cylindrical cavities or holes of about 0.5 mm diameter each and 1.3 mm in depth, arranged in a 1 mm grid pattern thereupon. The number of cavities or holes was at least 300. The cavities of each plate thus extended completely through the plate. These plates were cleaned and individually immersed in a 5% aqueous polyvinyl alcohol (PVA) solution (molecular weight of about 80000) so that the cylindrical cavities were filled with PVA solution. Some plates (about five to seven) treated in this manner were then stacked congruently and fixed in position, so that the cavities lined up. A stream of air caused the PVA solution to be removed from the cavities except for a thin PVA film which adhered to and coated the walls of the cavities. Short-term drying at 100° C. to 150° C. caused the PVA film to dry to the walls of the cavities, and also to fix the plates together, so that no liquid could get between the plates in subsequent steps.

Cavities not to be coated with pigment were then masked. The plates were then immersed in an aqueous 5% tannin solution, causing the polymer layer to harden, and excess tannic acid to adhere to the surface of the polymer. A part of the water content of the solvent was removed at 100° to 150° C. and the plates were then immersed in a 2% aqueous PVA solution (molecular weight to about 80000) containing a luminous red pigment (30%). Following immersion, a portion of the suspension was not hardened by the excess tannin and was removed from the cavities, leaving a hardened layer of polymer without pigment within the cavities.

After drying, the previous mask was removed, and the substrate remasked, coated with excess tannic acid and immersed in a suspension of luminous blue pigment (30%) in aqueous 2% PVA (molecular weight of about 80000), using the method previously described, followed by removal of unhardened polymer and drying, to provide a hardened layer of polymer with blue pigment on the uncovered cavities.

A remasking and coating procedure was then carried out for the application of a green pigment.

Instead of the various pigment immersion steps, the pigment suspension can be introduced into the open cavities by pouring.

Pyrolysis of the plates was then carried out at a temperature of 350° C. to 600° C., to remove all organic components of the various layers, thus leaving the walls of the cavities coated only with homogeneous layers of luminous pigments.

Figure 2:
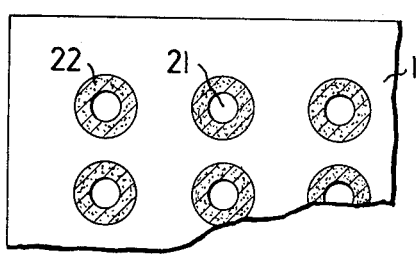
FIG. 2 shows an elevational view on a substrate in form of a plate with cylindrical cavities or holes arranged in a grid pattern thereupon.

FIG. 2 shows an elevational view on a substrate 1 in form of a plate with cylindrical cavities or holes 21 arranged in a grid pattern thereupon. The side walls of the holes 21 which are sperical surfaces with a relatively small radius of curvature are coated with a homogeneous layer of luminous pigment.

Figure 3:
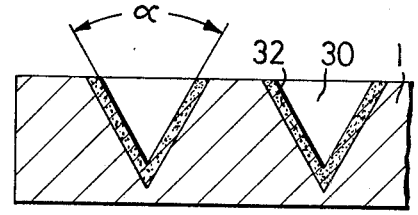
FIG. 3 represents a cross section of a substrate with V-grooved or conically shaped cavities or holes.

FIG. 3 represents a cross sectional view of a substrate 1 with v-grooved or conically shaped cavities or holes 30. The side walls of the cavities 30 which include a relatively small angle α are coated with a homogeneous layer 32 of luminous pigment.

It will be understood that the above description of the present invention is susceptible to various modifications, changes and adaptations, and the same are intended to be comprehended within the meaning and range of equivalents of the appended claims.

What is claimed is:

1. A method for producing a coating of pigment on a substrate, comprising:
   (a) providing said substrate with a first coating of a chemically hardenable polymer, and then drying said first coating;
   (b) contacting said dried first coating with a hardening agent compatible with said polymer in an amount sufficient to completely harden said polymer and to leave excess hardening agent on the surface of said polymer;
   (c) subsequently providing said first coating with a second coating comprising a polymer which is compatible with said agent and a pigment suspended therein, such that a portion of said second coating is hardened by said excess agent;
   (d) removing the non-hardened portion of said second coating; and
   (e) heating the coated substrate for a time and at a temperature sufficient to pyrolyze said hardened polymer, but insufficient to decompose said pigment, to leave a substrate covered only with pigment.

2. The method according to claim 1 wherein said steps of contacting, providing said second coating, and removing said non-hardened portion of said second coating are performed in sequence at least two times, with at least two of the times being with different pigments, in order that portions of said substrate may be coated with different pigments.

3. The method according to claim 1 wherein said temperature is about 350° to about 600° C.

4. The method according to claim 1 wherein said pigment is a luminous pigment.

5. The method according to claim 1 wherein said polymers are water soluble polymers.

6. The method according to claim 5 wherein said polymers are selected from the group consisting of polyvinyl alcohol, polyvinyl pyrrolidone and cellulose derivatives.

7. The method according to claim 6 wherein said agent is tannic acid or a tannic acid derivative.

8. The method according to claim 1 wherein said agent is tannic acid or a tannic acid ester.

9. Method as defined in claim 1 wherein the pigment coating is produced on a planer substrate surface.

10. Method as defined in claim 1 wherein the pigment coating is produced on a spherical substrate surface having a small radius of curvature.

11. Method as defined in claim 1 wherein the pigment coating is produced on a substrate surface having edge faces that form angles.

12. A method for producing a coating of pigment on a substrate, comprising:
   (a) providing said substrate with a first coating of a chemically hardenable polymer, and then drying said first coating;
   (b) contacting said dried first coating with a hardening agent compatible with said polymer in an amount sufficient to completely harden said polymer and to leave excess hardening agent on the surface of said polymer;
   (c) subsequently providing said first coating with a second coating comprising a polymer which is compatible with said agent and an organic or organometallic pigment suspended therein, such that a portion of said second coating is hardened by said excess agent;
   (d) removing the non-hardened portion of said second coating; and
   (e) drying the coated substrate at a temperature of about 100° to 150° to remove solvent components.

13. The method according to claim 1 wherein said steps of contacting, providing said second coating, and removing said non-hardened portion of said second coating are performed in sequence at least two times, with at least two of the times being with different pigments, in order that portions of said substrate may be coated with different pigments.

14. The method according to claim 12 wherein said pigment is a luminous pigment.

15. The method according to claim 12 wherein said polymers are water soluble polymers.

16. The method according to claim 15 wherein said polymers are selected from the group consisting of polyvinyl alcohol, polyvinyl pyrrolidone and cellulose derivatives.

17. The method according to claim 16 wherein said agent is tannic acid or a tannic acid derivative.

18. The method according to claim 12 wherein said agent is tannic acid or a tannic acid ester.

19. Method as defined in claim 12 wherein the pigment coating is produced on a planar substrate surface.

20. Method as defined in claim 12 wherein the pigment coating is produced on a spherical substrate surface having a small radius of curvature.

21. Method as defined in claim 12 wherein the pigment coating is produced on a substrate surface having edge faces that form angles.

* * * * *